(12) United States Patent
Sugiyama et al.

(10) Patent No.: US 6,627,576 B2
(45) Date of Patent: Sep. 30, 2003

(54) DOUBLE METAL CYANIDE COMPLEX CATALYST FOR RING OPENING POLYMERIZATION OF ALKYLENE OXIDE AND ITS PRODUCTION PROCESS

(75) Inventors: Kayoko Sugiyama, Kawasaki (JP); Shigeru Ikai, Kashima-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/228,919

(22) Filed: Aug. 28, 2002

(65) Prior Publication Data

US 2003/0100444 A1 May 29, 2003

(30) Foreign Application Priority Data

Aug. 31, 2001 (JP) ........................................ 2001-264866

(51) Int. Cl.[7] ............................................... B01J 27/26
(52) U.S. Cl. ...................................................... 502/175
(58) Field of Search ................................. 502/175, 200, 502/162, 167, 172

(56) References Cited

U.S. PATENT DOCUMENTS

| | | |
|---|---|---|
| 3,278,457 A | 10/1966 | Milgrom |
| 4,472,560 A | 9/1984 | Kuyper et al. |
| 4,843,054 A | 6/1989 | Harper |
| 5,158,922 A | 10/1992 | Hinney et al. |
| 5,470,813 A | 11/1995 | Le-Khac |
| 5,637,673 A | 6/1997 | Le-Khac |
| 5,714,639 A | 2/1998 | Bowman et al. |
| 5,952,261 A | 9/1999 | Combs |
| 6,036,879 A | 3/2000 | Lawrey et al. |
| 6,204,357 B1 | 3/2001 | Ooms et al. |
| 6,313,060 B1 | 11/2001 | Sugiyama et al. |

FOREIGN PATENT DOCUMENTS

| | | |
|---|---|---|
| DE | 198 09 539 | 9/1999 |
| JP | 4-145123 | 5/1992 |
| JP | 8-311171 | 11/1996 |
| WO | WO 01/03831 A1 | 1/2001 |
| WO | WO 01/80994 | 11/2001 |

*Primary Examiner*—Elizabeth D. Wood
(74) *Attorney, Agent, or Firm*—Oblon, Spivak, McClelland, Maier & Neustadt, P.C.

(57) ABSTRACT

A process for producing a double metal cyanide complex catalyst for ring opening polymerization of alkylene oxide, which comprises subjecting a substantially crystalline double metal cyanide compound to a contact treatment by heating at from 45 to 125° C. with an aqueous solution containing an organic ligand and a metal salt, and then separating the resulting solid from the obtained slurry.

22 Claims, 2 Drawing Sheets

DOUBLE METAL CYANIDE COMPLEX CATALYST FOR RING OPENING POLYMERIZATION OF ALKYLENE OXIDE AND ITS PRODUCTION PROCESS

The present invention relates to a double metal cyanide complex catalyst for ring opening polymerization of alkylene oxide, and its production process.

Heretofore, a polyether polyol useful as a material for e.g. a polyurethane elastomer, an adhesive, a coating, a polyurethane foam, etc., has been produced by polymerization of an alkylene oxide such as ethylene oxide or propylene oxide by using an initiator having active hydrogen. As typical polymerization catalysts of the alkylene oxide, an alkali metal (anionic polymerization), a BF3 etherate (cationic polymerization) and a double metal cyanide complex catalyst (hereinafter referred to as DMC catalyst) (coordination polymerization) have been well known. Among these catalysts, with the DMC catalyst as compared with the former two catalysts, the polymerization activity is high, a cyclic ether compound such as a dioxane derivative will not be produced as a by-product, and a reaction which produces a monool having an unsaturated bond as a by-product is less likely to take place, whereby production of a polyol having a high molecular weight is possible.

The DMC catalyst has been found quite some time ago (U.S. Pat. No. 3,278,457). In recent years, it has been proposed that among organic ligands for the DMC catalyst, tert-butyl alcohol is particularly excellent (JP-A-4-145123, JP-A-8-311171). Further, various modifications regarding the DMC catalyst have successively been proposed. When tert-butyl alcohol is used, the life of the catalyst tends to be remarkably long, and the catalyst remaining in the product polyol can be decreased to a level of at most several 10 ppm even without purification.

The DMC catalyst is a catalyst which is insoluble in water, which contains an organic ligand, water and a metal salt. A typical example of the DMC catalyst excellent in polymerization property is zinc hexacyanocobaltate ($Zn_3[Co(CN)_6]_2$) containing an organic ligand, water and zinc chloride. A typical production method of such a DMC catalyst will be shown taking zinc hexacyanocobaltate as an example. As shown in the formula (1), an aqueous solution of excess zinc chloride and an aqueous solution of an alkali metal hexacyanocobaltate are mixed in the presence of an organic ligand, so that a solid of a double metal cyanide compound, in which the organic ligand, water and zinc chloride are combined by coordinate bonds, is precipitated, and the solid is washed with a mixed solution of water and the organic ligand and dried to obtain a powdery solid DMC catalyst:

$$ZnCl_2+K_3Co(CN)_6(H_2O/Ligand) \rightarrow Zn_3[Co(CN)_6]_2 X(ZnCl_2)Y(H_2O)Z(Ligand)+KCl \quad (1)$$

Otherwise, an aqueous solution of excess zinc chloride containing no organic ligand and an aqueous solution of an alkali metal hexacyanocobaltate are mixed so that a solid of a double metal cyanide compound is precipitated, and before the solid is separated by e.g. filtration or centrifugal separation, an organic ligand or an organic ligand-containing aqueous solution is added to the mixed solution. If no organic ligand is used at all, the activity as a polymerization catalyst is very low, or no activity is shown at all (U.S. Pat. No. 5,470,813).

The type of the organic ligand, and the ratios of the organic ligand, water and zinc chloride to zinc hexacyanocobaltate are important factors which have an impact on the catalytic property. In the formula (1), as evident from the chemical structural formula of the DMC catalyst as a product, zinc chloride is used in an amount far greater than the stoichiometric amount based on the alkali metal hexacyanocobaltate (Zn/Co atomic ratio: 1.5), and a water-soluble alkali metal salt produced by ligand exchange as a by-product is dissolved in the mixed solution. It has been proposed to produce an active DMC catalyst by mixing zinc chloride in a stoichiometric amount or less based on the alkali metal hexacyanocobaltate, only under a special condition such that the organic ligand and a compound of Group 2A of the Periodic Table coexist at the time of solid precipitation (U.S. Pat. No. 5,952,261).

The solid insoluble in water, which is precipitated by mixing an aqueous solution of zinc chloride with an aqueous solution of an alkali metal hexacyanocobaltate is separated from the solution by e.g. filtration or centrifugal separation. An alkali metal salt remains in a part of the solid, which has an effect as a poison and may deteriorate polymerization activity (U.S. Pat. No. s 3,278,457, 4,472,560). This unnecessary alkali metal salt may be removed by washing the solid with an organic ligand-containing aqueous solution. The alkali metal salt decreases the catalytic activity, and accordingly it is preferably removed as far as possible by washing the precipitated solid with water, however, if the precipitated solid is washed with water, even zinc chloride necessary for obtaining the catalytic activity may also be removed (U.S. Pat. No. 5,158,922). Accordingly, in many cases, washing is carried out with organic ligand-containing aqueous solutions having different compositions several times so that a certain amount of zinc chloride remains. Accordingly, in industrial production process of the DMC catalyst, it has been required to carry out a separation treatment of zinc chloride and cyanocobaltate in the organic ligand-containing waste at the time of recovery, recycle and disposal of the mixed solution of zinc chloride and the alkali metal hexacyanocobaltate and the solution used for washing the solid, thus increasing the cost.

U.S. Pat. No. 4,472,560 discloses a method of mixing a solid precipitated by mixing an aqueous solution of zinc chloride in an amount about double the stoichiometric amount and an aqueous solution of an alkali metal hexacyanocobaltate, and zinc chloride in a molar ratio of 1:1 in a dimethoxyethane aqueous solution, and evaporating the volatile component to prepare a slurry catalyst (Example 16). The polymerization activity is low, and preferred concentration of dimethoxyethane, the amount of zinc chloride, the temperature, etc. in this catalyst preparation system are not disclosed.

On the other hand, in a case where zinc chloride and an alkali metal hexacyanocobaltate are reacted and the obtained precipitated solid is separated, the double metal cyanide compound slurry solution containing excess zinc chloride, an organic ligand and water is in the form of paste, and separation by filtration of the precipitated solid from the solution tends to be difficult (U.S. Pat. Nos. 4,843,054, 5,158,922, 5,952,261). Further, the slurry solution is in the form of paste even when the separated solid is washed with an aqueous solution containing the organic ligand, and the separation by filtration of the solid from the solution tends to be difficult.

Further, WO01/03831 proposes a method for producing a DMC catalyst in such a manner that zinc chloride and an alkali metal hexacyanocobaltate in a stoichiometric amount are reacted to precipitate a solid, and after the precipitated solid is dried, a small amount of an aqueous solution of the organic ligand and zinc chloride in an atomic ratio of at most 1.5 based on cobalt is impregnated in the solid and held at room temperature or under a slightly heated condition, followed by drying. However, no adequate catalytic activity can be obtained, the molecular weight distribution of the produced polyol tends to be broad, and the viscosity of the polyol tends to be high.

A conventionally proposed DMC catalyst has a high activity, and when a polyether polyol is produced by using such a catalyst, production of a polyether monool having an unsaturated bond as a by-product can be suppressed, however, as mentioned above, production of the catalyst tends to be complicated and take long, and accordingly the catalyst cost tends to increase. Accordingly, a process for producing a DMC catalyst which can produce a polyether polyol having a low degree of unsaturation with a high activity easily in a short period of time, has been required.

The present inventors have conducted extensive studies to achieve the above object and as a result, they have found to use a substantially crystalline double metal cyanide compound as a starting material. When the compound is substantially crystalline, filtration at the time of its preparation tends to be easy, and thus the compound is suitable as a starting material. The substantially crystalline double metal cyanide compound is subjected to a contact treatment by heating with an aqueous solution containing an organic ligand and a metal salt, and the resulting solid is separated from the obtained slurry. The present inventors have found a DMC catalyst for ring opening polymerization of alkylene oxide capable of producing a polyether polyol having a low degree of unsaturation with an excessively high activity, produced by carrying out the contact treatment by heating at a specific temperature range with a specific organic ligand concentration, and its production process. The present invention has been accomplished on the basis of this discovery.

Namely, the present invention is to provide a process for producing a DMC catalyst for ring opening polymerization of alkylene oxide, which comprises subjecting a substantially crystalline double metal cyanide compound to a contact treatment by heating with an aqueous solution containing an organic ligand and a metal salt, and then separating the resulting solid from the obtained slurry.

The present invention further provides a DMC catalyst for ring opening polymerization of alkylene oxide, obtained by the above process.

Now, the present invention will be explained in detail with reference to the preferred embodiments.

In the first aspect, the present invention provides a process for producing a double metal cyanide complex catalyst for ring opening polymerization of alkylene oxide, which comprises subjecting a substantially crystalline double metal cyanide compound to a contact treatment by heating with an aqueous solution containing an organic ligand and a metal salt, and then separating the resulting solid from the obtained slurry.

The substantially crystalline double metal cyanide compound used in the present invention may, for example, be a cyanometalate of the formula $(M_a)_m[M_b(CN)_nA_j]_p$ or its hydrate.

$M_a$ is at least one bi- or higher valent transition metal selected from the group consisting of Zn(II), Fe(II), Fe(III), Co(II), Ni(II), MO(IV), MO(VI), Al(III), V(V), Sr(II), W(IV), W(VI), Mn(II), Cr(III), Cu(II), Sn(II), Cd(II) and Pb(II). Particularly preferred is Zn(II) or Fe(II).

$M_b$ is at least one bi- or higher valent transition metal selected from the group consisting of Fe(II), Fe(III), Co(II), Co(III), Cr(II), Cr(III), Mn(II), Mn(III), Ni(II), Ir(III), Rh(II), Ru(II), V(IV) and V(V). Particularly preferred is Co(III) or Fe(III).

A is an anion ligand other than a cyano group (CN), and it may, for example, be halide, sulfate, carbonate, nitrate, thiocyanate, isothiocyanate or carboxylate.

The subindices n and j are integers of from 1 to 6 and from 0 to 5, respectively, provided that n+j is determined by the metal $M_b$, and is 4, 5 or 6, j is preferably at most 3, more preferably 1 or 0, particularly preferably 0. n is more preferably from 3 to 6, particularly preferably 4 to 6. m and p are determined so that the cyanometalate anion and the metal cation ($M_a$) maintain electrical neutrality, for example, when $M_a$ is Zn(II) and $M_b$ is Co(III), m is 3 and p is 2.

Specific examples of the preferred double metal cyanide compound of the present invention include $Zn_3[Fe(CN)_6]_2$, $Zn_3[Co(CN)_6]_2$, $Zn_3[Fe(CN)_5Cl]_2$, $Zn_3[Co(CN)_5Cl]_2$, $Fe_3[Fe(CN)_6]_2$, $Fe_3[Co(CN)_6]_2$, $Fe_3[Fe(CN)_5Cl]_2$ and $Fe_3[Co(CN)_5Cl]_2$, and more preferred is a zinc hexacyanometalate, particularly preferred is zinc hexacyanocobaltate $Zn_3[Co(CN)_6]_2$.

In the present invention, the substantially crystalline double metal cyanide compound may be produced by any method, but is produced preferably by mixing an aqueous solution of a metal salt with an aqueous solution of a transition metal cyanide compound, and separating the precipitated solid from the mixed solution. The metal salt is represented by $M_a(X)_r$, wherein $M_a$ is the same as $M_a$ in the above formula, and X is one similar to A in the above formula. The preferred X is a halide, and chloride is particularly preferred. The subindex r is an integer corresponding to the valence of the metal cation ($M_a$), and the more preferred metal salt is zinc halide, particularly preferred is zinc chloride ($ZnCl_2$).

The transition metal cyanide compound may, for example, be an alkali metal cyanometalate, an alkaline earth metal cyanometalate, an ammonium cyanometalate or a cyanometalate acid. The metal constituting the cyanometalate is $M_b$ of the above formula. Specifically, $H_3Fe(CN)_6$, $H_3Co(CN)_6$, $K_3Fe(CN)_6$, $K_3CO(CN)_6$, $Na_3Fe(CN)_6$, $Na_3Co(CN)_6$, $Mg_3(Fe(CN)_6)_2$, $Mg_3(Co(CN)_6)_2$, $(NH_4)_3Fe(CN)_6$ or $(NH_4)_3Co(CN)_6$ may, for example, be mentioned. Among them, as the transition metal cyanide compound, an alkali metal cyanometalate is preferred, an alkali metal hexacyanocobaltate is more preferred, and potassium hexacyanocobaltate ($K_3CO(CN)_6$) is particularly preferred.

Each of the metal salt and the transition metal cyanide compound is used preferably as an aqueous solution containing no organic ligand, to obtain an adequate effect of the present invention. Namely, by using an aqueous solution containing no organic ligand, the solid precipitated by mixing the metal salt with the transition metal cyanide compound, tends to be substantially crystalline, and the separation (by filtration) tends to be easy. Further, at the same time, a water-soluble metal salt (such as an alkali metal halide) as a by-product is likely to be extracted and removed from the precipitated solid. In order to obtain a solid from which a slight amount of by-product metal salt which still remains is adequately removed, the precipitated solid may be washed with water repeatedly.

In the present invention, with respect to the relative molar ratio of the metal salt to the transition metal cyanide compound (metal salt/transition metal cyanide compound), the metal salt is in excess of from 3 to 30% over the stoichiometric amount based on the produced double metal cyanide compound, the metal salt is more preferably in excess of from 5 to 18% over the stoichiometric amount, and the metal salt is particularly preferably in excess of from 7 to 15% over the stoichiometric amount. If the metal salt is in excess of more than 30% over the stoichiometric amount, the metal salt is likely to remain in water in a large amount, and if the metal salt is in excess of less than 3% of the stoichiometric amount, the transition metal cyanide compound, waste of which is more difficult, is likely to remain in the aqueous solution, and the separation property (filtration property) of the precipitated solid tends to be poor, and it is disadvantageous in view of waste disposal after separation. Further, both components are mixed with stirring preferably under heating adequately, whereby the reaction of both components is likely to be completed, separation of the solid tends to be easy, and further, even if the metal salt remains in the aqueous solution after separation, its amount is very little, and the waste disposal tends to be easy.

Specifically, in a case where the double metal cyanide compound is zinc hexacyanocobaltate, the substantially crystalline double metal cyanide compound is obtained preferably by mixing an aqueous solution of a zinc halide with an aqueous solution of an alkali metal hexacyanocobaltate in the following specific ratio, followed by separation from the mixed solution. The specific ratio as the Zn/Co atomic ratio is preferably from 1.545 to 1.800, more preferably from 1.575 to 1.770, particularly preferably from 1.605 to 1.725. Here, the Zn/Co atomic ratio is the molar ratio of the zinc atom in the metal salt to the cobalt atom in the transition metal cyanide compound.

The concentration of each of the metal salt aqueous solution and the transition metal cyanide compound aqueous solution is preferably the concentration of saturated solution or below. If these aqueous solutions are mixed at concentrations exceeding the concentration of saturated solution, the mixed state of the solutions tends to be non-uniform, and no crystalline double metal cyanide compound may be obtained.

Mixing of the aqueous solution of the metal salt with the aqueous solution of the transition metal cyanide compound is carried out by adding the latter to the former, or by adding the former to the latter. The mixing of these solutions are carried out preferably with adequate stirring.

The reaction temperature is, in the case where the aqueous solutions are employed, preferably from 5 to 95° C., more preferably from 30 to 90° C., particularly preferably from 50 to 80° C. If the reaction temperature is from 5 to 95° C., both components may be used effectively, and the solid of the double metal cyanide compound will adequately be precipitated.

The precipitated solid obtained by mixing the aqueous solution of the metal salt with the aqueous solution of the transition metal cyanide compound is separated from the mixed slurry solution, and the solid product without washed with water or washed with water is separated and dried to obtain the crystalline double metal cyanide compound. The separation of the precipitated solid from the mixed slurry solution or the slurry solution washed with water may be carried out by conventionally known filtration, filtration under pressure, centrifugal separation, etc. The water-soluble metal salt particularly alkali metal halide as a by-product tends to be a poison in the DMC catalysts for ring opening polymerization of alkylene oxide, and accordingly in the present invention, the water-soluble metal salt as a by-product is preferably removed by washing the solid with water at the time of separation of the precipitated solid.

In the present invention, the crystalline double metal cyanide compound as a dry solid obtained as mentioned above, is subjected to the following contact treatment by heating with an aqueous solution containing an organic ligand and a metal salt. The double metal cyanide compound in the form of a cake containing a large amount of water, after washed with water without drying, is preferably subjected to the following step directly, in view of production cost. Further, if the solid separated from the slurry is dried, the activity of the DMC catalyst to be finally obtained tends to be low. The water content of the double metal cyanide compound in the form of a cake is preferably from 20 to 80 mass %, more preferably from 30 to 70 mass %, particularly preferably from 40 to 65 mass %.

So long as the double metal cyanide compound as the precipitated solid is substantially crystalline, it may contain an excess metal salt over the stoichiometric amount, although its amount is small, and may further contain water as the ligand. The remaining amount of the metal salt contained in the double metal cyanide compound is determined also by e.g. the amount of the metal salt introduced and conditions for washing the precipitated solid with water, and the remaining amount of water is determined by e.g. conditions for drying the precipitated solid.

Figure 1:
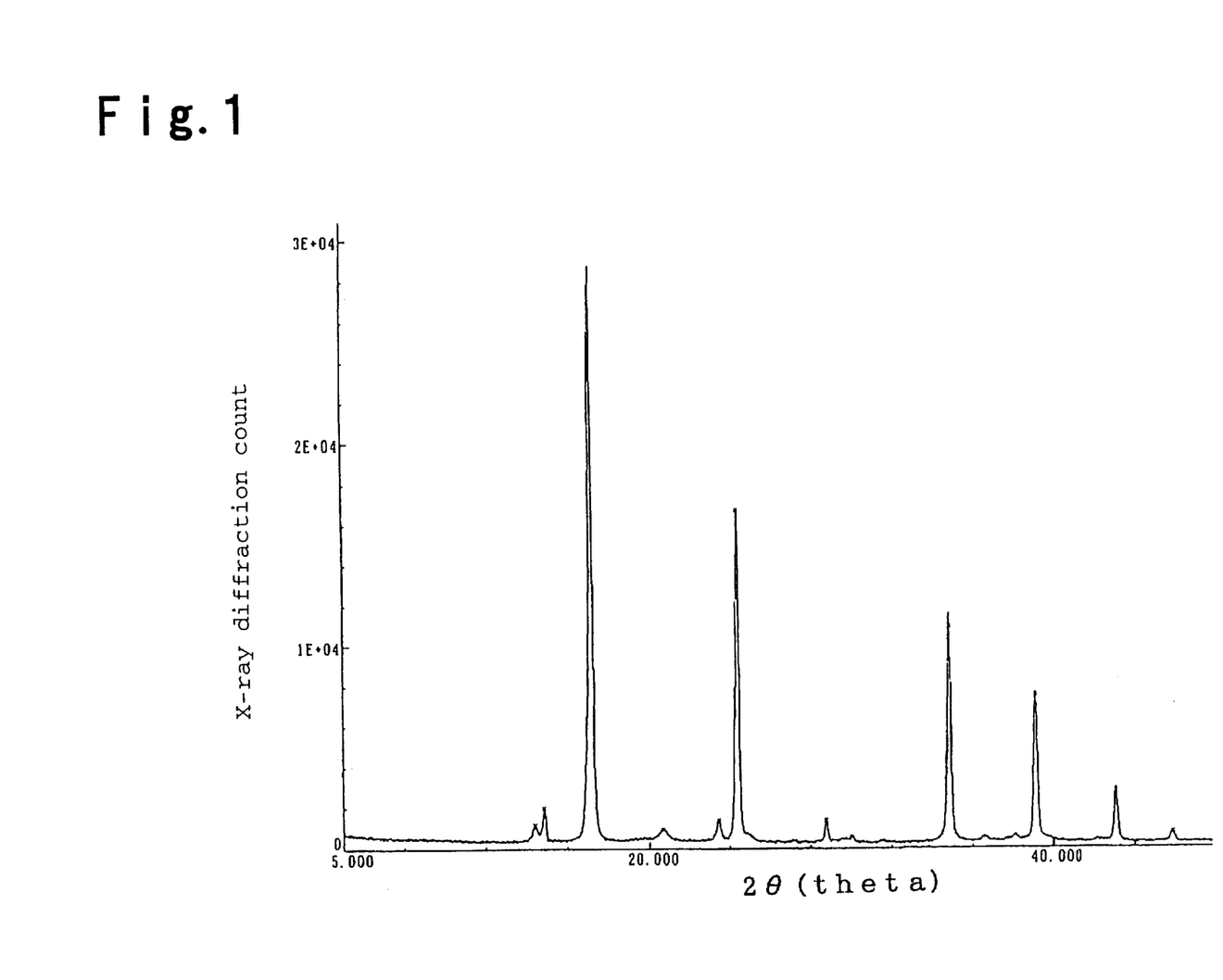
FIG. 1 is an X-ray diffraction pattern of a powder of the double metal cyanide compound obtained by drying the precipitated solid after washed with water in Example 1.

The substantially crystalline double metal cyanide compound is one having a diffraction pattern similar to the X-ray diffraction pattern of an existing cubic double metal cyanide compound. As shown by the result of the X-ray diffraction (XRD) of zinc hexacyanocobaltate shown in FIGS. 1 and 2, the X-ray diffraction pattern of the substantially crystalline powdery solid has four peaks having a particularly high diffraction intensity and having a narrow half-width at 17.1–17.5 degree, 23.4–24.7 degree, 34.8–35.2 degree and 39.1–39.5 degree, within a range of at most 40 degree as the value 2θ. When the compound has a high crystallinity, the diffraction pattern exhibits peaks having a narrow half-width and a high diffraction intensity. When the compound has a low crystallinity, i.e. the crystal size is small, the solid exhibits a gentle mountain-form peak with a broad half-width and a small diffraction intensity. The substantially crystalline double metal cyanide compound of the present invention includes one which exhibits a diffraction pattern having only four peaks having a high diffraction intensity and having a narrow half-width within a range of at most 40 degree as the 2θ value (FIG. 2) and one which exhibits a diffraction pattern having such four peaks and a group of peaks having a low diffraction intensity and having a broad width, based on a double metal cyanide compound having another structure with a so-called small crystal size, in the vicinity thereof (FIG. 1).

In the present invention, the substantially crystalline double metal cyanide compound is subjected to a contact treatment by heating with an aqueous solution containing an organic ligand and a metal salt, and then the resulting solid is separated from the obtained slurry, to produce the DMC catalyst for ring opening polymerization of alkylene oxide. The metal salt used for the contact treatment by heating may be one similar to those as mentioned above. Preferred as the metal salt is a salt of Zn(II) or Fe(II).

As the organic ligand, any electron donor which is well known for synthesis of the DMC catalysts, such as an alcohol, an ether, a ketone, a ester, an amine or an amide may be used. Preferred as the organic ligand is a water-soluble one, and as a specific example, at least one compound selected from the group consisting of tert-butyl alcohol, n-butyl alcohol, iso-butyl alcohol, tert-pentyl alcohol, iso-pentyl alcohol, N,N-dimethylacetoamide, ethylene glycol dimethyl ether (glyme), diethylene glycol dimethyl ether (diglyme), triethylene glycol dimethyl ether (triglyme), ethylene glycol mono-tert-butyl ether, iso-propyl alcohol and dioxane may be mentioned. The dioxane may be either 1,4-dioxane or 1,3-dioxane, and 1,4-dioxane is preferred. Particularly preferred as the organic ligand is tert-butyl alcohol, tert-pentyl alcohol or ethylene glycol mono-tert-butyl ether.

In the present invention, the concentration of the organic ligand based on the total amount of water and the organic ligand in the contact treatment by heating is important, and the concentration is preferably from 15 to 85 mass %, more preferably from 20 to 80 mass %, particularly preferably from 30 to 80 mass %. When it is from 15 to 85 mass %, the DMC catalyst for ring opening polymerization of alkylene oxide having a high catalytic activity can be obtained. With respect to the content of the metal salt in the aqueous solution containing the organic ligand and the metal salt, the molar ratio based on the crystalline double metal cyanide compound (metal salt/double metal cyanide compound) is preferably from 1 to 16, more preferably from 1.5 to 10, furthermore preferably from 3.4 to 8, and particularly preferably from 4 to 6. When it is within a range of from 1 to 16, the cost required for the waste disposal of the metal salt can be suppressed low, and a catalyst having a high polymerization activity can be obtained. Further, the concentration of the metal salt in the aqueous solution containing the organic ligand and the metal salt is preferably from 1.6 to 10 mass %, more preferably from 2.6 to 9 mass %, particularly preferably from 3.4 to 8 mass %. The concentration of the solid product when the contact treatment by heating is carried out is preferably from 3 to 16 mass %, more preferably from 5 to 13 mass %.

The contact treatment by heating may be carried out by stirring, mixing and heating the aqueous solution containing the solid product, the organic ligand and the metal salt. The temperature of the contact treatment by heating as well as the organic ligand concentration is an important factor, and the temperature is preferably from 45 to 125° C., more preferably from 50 to 100° C., particularly preferably from 50 to 85° C. The time for the contact treatment by heating is usually from 15 to 300 minutes, preferably from 30 to 120 minutes.

The slurry obtained by the above contact treatment by heating is subjected to solid separation by a conventional method such as filtration or centrifugal separation, to obtain a cake containing the DMC catalyst. By carrying out the solid separation, compounds other than the organic ligand, the metal salt and water required for formation of the active DMC catalyst are removed, and the DMC catalyst having a high activity can be obtained.

It is preferred to add a poly(alkylene oxide) before the contact treatment by heating so that the contact treatment by heating is carried out in the coexistence of the poly(alkylene oxide), and then separate the solid from the slurry. By this treatment, the rate of the solid separation by e.g. filtration may be improved, and the catalytic activity is less likely to decrease as well. Further, the poly(alkylene oxide) may be added to the slurry after the contact treatment by heating, and then the solid is separated from the slurry. By this treatment, the rate of the solid separation tends to be improved. The amount of the poly(alkylene oxide) added is preferably from 0.5 to 50 parts by mass, more preferably from 3 to 30 parts by mass, particularly preferably from 5 to 20 parts by mass, per 100 parts by mass of the crystalline double metal cyanide compound as calculated as dry mass. The amount is preferably within the above range either in the case where the poly(alkylene oxide) is added before the contact treatment by heating or in the case where it is added after the treatment. The amount as calculated as dry mass is meant for the dry mass when the sample is dried at 60° C. under a reduced pressure of 1 kPa for 5 hours.

Further, the cake after the contact treatment by heating may be washed with an aqueous solution containing an organic ligand. The washing may be carried out repeatedly several times. Further, the washing may be carried out with an aqueous solution containing an organic ligand different from the organic ligand used for the contact treatment by heating, followed by separation of the solid. In a case where the cake is washed with the aqueous solution containing an organic ligand, the concentration of the organic ligand is preferably from 50 to 100 mass %, particularly preferably from 70 to 98 mass %. In this washing operation also, a poly(alkylene oxide) may be added. Namely, a poly(alkylene oxide) may be added in the washing operation, and after adequate mixing, the solid is separated, whereby the rate of solid separation tends to be improved.

From the obtained cake containing the DMC catalyst, excess water and the organic ligand are removed under the following conditions, for example, to obtain the DMC catalyst for ring opening polymerization of alkylene oxide of the present invention. The method for removing excess water and the organic ligand, may, for example, be a drying method by heating, a drying method under vacuum, or a method of removing moisture and a volatile organic ligand after mixing with a hardly volatile liquid of e.g. a poly(alkylene oxide). The temperature for removal by drying is usually from 20 to 150° C., preferably from 30 to 100° C., particularly preferably from 40 to 85° C., so that not all the organic ligand and water contained in the catalyst are evaporated.

In the present invention, the DMC catalyst is preferably a DMC slurry catalyst. The DMC slurry catalyst is produced by dispersing the DMC catalyst in a poly(alkylene oxide) and formed into a slurry, and it does not include one having the dried DMC catalyst dispersed therein. The DMC slurry catalyst has a high activity and is preferred. Namely, as the method for producing the DMC slurry catalyst, (i) a method of dispersing the wet cake (which is not dried) separated by the washing operation in a poly(alkylene oxide), and removing excess water and organic ligand which remain in small amounts by drying, or (ii) a method of adding a poly(alkylene oxide) at a stage before the solid (cake) is separated by the washing operation, and removing a relatively large amount of water and organic ligand therefrom, may be mentioned. As the poly(alkylene oxide), a polyether polyol may suitably be used. Its molecular weight is usually from 300 to 12,000, preferably from 500 to 10,000, particularly preferably from 700 to 5,000. The content of the DMC catalyst in the DMC slurry catalyst is preferably from 1 to 15 mass %, more preferably from 2 to 10 mass %, particularly preferably from 3 to 7 mass %. If the content of the DMC catalyst in the DMC slurry is over 15 mass %, the DMC slurry catalyst becomes in the form of paste, and is difficult to handle. The content of the DMC catalyst is as calculated as the dry mass when the sample before addition of the poly(alkylene oxide) is dried at 60° C. under a reduced pressure of 1 kPa for 5 hours.

The above-described production process of the DMC catalyst will be briefly described below, including the preferred embodiments.

(I) A step of mixing an aqueous solution of a metal salt with an aqueous solution of a transition metal cyanide compound, followed by separation from the mixed solution to obtain a substantially crystalline double metal cyanide compound.

(II) A step of subjecting the double metal cyanide compound obtained in the step (I) to a contact treatment by heating at from 45 to 125° C. with an aqueous solution containing an organic ligand and a metal salt, and then separating the resulting solid from the slurry.

(III) A step of washing the solid obtained in the step (II) with an aqueous solution containing an organic ligand.

The DMC catalyst is produced by means of the above steps (provided that the step (III) may be omitted, or may be carried out at least two times). Further, the DMC slurry catalyst may be produced by further carrying out the following step.

(IV) A step of dispersing the undried DMC catalyst in a poly(alkylene oxide) to produce a DMC slurry catalyst.

In the second aspect, the present invention provides a catalyst for ring opening polymerization of alkylene oxide which comprises the DMC catalyst produced by the above process, and can be produced by the process for producing the DMC catalyst for ring opening polymerization of alkylene oxide of the present invention.

A polyether polyol can be produced by ring opening polymerization of an alkylene oxide by using the DMC catalyst for ring opening polymerization of alkylene oxide.

The ring opening polymerization of an alkylene oxide is carried out in the presence of the above catalyst for ring opening polymerization of alkylene oxide of the present invention. For example, an alkylene oxide including an alkylene oxide having a carbon number of at least 3 is subjected to ring opening polymerization with a monohydroxy compound as an initiator to produce a polyether monool. Otherwise, an alkylene oxide including an alkylene oxide having a carbon number of at least 3 is subjected to ring opening polymerization with a polyhydroxy compound having at least two hydroxyl groups as an initiator to produce a polyether polyol.

The alkylene oxide preferably includes an alkylene oxide having a carbon number of at least 3. The alkylene oxide having a carbon number of at least 3 may, for example, be propylene oxide, 1,2-butylene oxide, 2,3-butylene oxide or epichlorohydrine. Two or more of these may be used together, and in such a case, they may be mixed with each other for a reaction, or they may be successively subjected to a reaction.

In the case of using the catalyst for ring opening polymerization of alkylene oxide of the present invention, ethylene oxide as an alkylene oxide having a carbon number of 2 alone hardly undergoes reaction, and it may undergo reaction by mixing with an alkylene oxide having a carbon number of at least 3 and adding the mixture to the reaction system. Particularly preferred alkylene oxide is propylene oxide alone or a combination of propylene oxide with ethylene oxide.

Further, in the case of producing a resilient polyurethane foam, the polyether polyol preferably has oxyethylene groups at the terminals, and the content of the terminal oxyethylene group is particularly preferably from 5 to 30 mass %. The polyether polyol having oxyethylene groups at the terminals can be produced by subjecting an alkylene oxide including an alkylene oxide having a carbon number of at least 3, to ring opening polymerization with an initiator by using the catalyst for ring opening polymerization of alkylene oxide of the present invention, and then reacting ethylene oxide therewith by using an alkali catalyst. As the alkali catalyst, an alkali metal such as sodium or potassium, an alkali metal hydroxide such as sodium hydroxide or potassium hydroxide, or an alkali metal alkoxide such as sodium alkoxide or potassium alkoxide, may, for example, be preferably used.

As specific examples of the monohydroxy compound and the polyhydroxy compound having at least 2 hydroxyl groups to be used as the initiator, the following are mentioned. However, such compounds are not limited thereto. Methanol, isopropyl alcohol, n-butyl alcohol, 2-ethylhexanol, 1-octadecanol, allyl alcohol, oleyl alcohol, ethylene glycol, diethylene glycol, propylene glycol, dipropylene glycol, glycerol, trimethylolpropane, pentaerythritol, diglycerol, sorbitol, dextrose, methyl glucoside, sucrose, bisphenol A, etc. Further, an alkylene oxide addition product of such an initiator may also be used as the initiator.

The polyether monol or the polyether polyol can be produced by adding the DMC catalyst for ring opening polymerization of alkylene oxide of the present invention to the hydroxy compound as the initiator, and gradually adding the alkylene oxide thereto to carry out the reaction. The amount of the catalyst is not particularly limited, and suitably at a level of from 1 to 5,000 ppm, more preferably from 100 to 1,000 ppm, particularly preferably from 20 to 300 rpm, based on the hydroxy compound to be used. The reaction temperature is preferably from 30 to 180° C., more preferably from 90 to 130° C. As the introduction of the catalyst to the reaction system, it may be initially introduced all at once, or it may be successively introduced in installments. The DMC catalyst for ring opening polymerization of alkylene oxide of the present invention has a high activity and long catalytic life, and accordingly the amount of the catalyst ultimately remaining in the polyether polyol is small, and the polyether polyol after completion of the reaction may be used as it is. Needless to say, removal of the catalyst may be carried out with various conventionally known methods depending upon the purpose of use.

By using the DMC catalyst for ring opening polymerization of alkylene oxide of the present invention, a polyether monool or a polyether polyol having a low degree of unsaturation and having a relatively high molecular weight can be produced while a side reaction is suppressed. The hydroxyl value of the polyether polyol produced by using the DMC catalyst for ring opening polymerization of alkylene oxide of the present invention is not particularly limited, but is usually from 2 to 70 mgKOH/g, and its degree of unsaturation is from 0.003 to 0.01 meq/g. When a resilient polyurethane foam is produced by using this polyether polyol having a low degree of unsaturation, such problems as decrease in hardness, decrease in ball rebound, deterioration in compression set and decrease in a curing property at the time of forming a foam, will be minimized, and particularly the crushing property of a seat cushion will significantly be improved. Accordingly, crushing will easily be carried out even in a case of producing a seat cushion having a large size and a complicated shape.

Further, the degree of unsaturation of the polyether polyol used for a polyurethane elastomer is preferably at most 0.01 meq/g. When the degree of unsaturation is at most 0.01 meq/g, the curing rate tends to be high, and excellent physical properties such as elongation and strength can be imparted to the polyurethane elastomer. This is considered to be distributable to the fact that the amount of unsaturated monool contained in the polyether polyol is small, and thus the substantial number of the functional groups is great.

The polyether monool and the polyether polyol obtained by the above method are useful for e.g. surfactant and lubricant in addition to the material for the polyurethane. Further, they are useful also as a polymer dispersed polyether polyol containing polymer fine particles.

Now, the present invention will be explained in further detail with reference to Examples. However, it should be understood that the present invention is by no means restricted to such specific Examples.

Examples 1 to 5 and 13 to 21 are Examples of the present invention, and Examples 6 to 12 are Comparative Examples. The X-ray diffraction pattern was obtained in such a manner that a sample was washed with water, dried at 50° C. for 4 hours and pulverized to prepare a sample for measurement, and measurement was carried out by using it. The X-ray diffraction pattern was measured by using an X-ray diffractometer (RAD) manufactured by Rigaku Corporation with monochromatized CuKα radiation ($\lambda$=0.154059 nm), in such conditions that 40 kV, 100 mA, step size: 0.02 degree, scanning speed: 3 degree/min, divergence slit width: 1 degree, scatter slit width: 1 degree, receiving slit width: 0.3 mm, within a scanning range of from 10 to 40 degree as 2θ.

Production of Catalyst for Ring Opening Polymerization of Alkylene Oxide

EXAMPLE 1

To an aqueous solution containing 2.1 g of potassium hexacyanocobaltate $K_3CO(CN)_6$ and 78 g of water heated to 40° C. in a 200 ml flask, 5 g of an aqueous solution containing 1.46 g of zinc chloride (Zn/Co atomic ratio: 1.70) was dropwise added over 10 minutes. During the dropwise addition, the reaction solution was stirred with a stirrer made of a polytetrafluoroethylene resin at 300 rotations per minute (hereinafter the rotations per minute is referred to as rpm), and after completion of the dropwise addition, stirring was further continued at 60° C. for 60 minutes. Then, filtration was carried out under reduced pressure by means of a circular filter plate having a diameter of 4 cm by using a filter paper for quantitative analysis of fine particles (No. 5C, manufactured by Advantec Toyo Kaisha Ltd., hereinafter referred to simply as 5C), and a solid was separated in about 25 minutes.

Then, this solid was dispersed in 40 g of water again, followed by stirring at room temperature for 30 minutes, and the washed solid was separated by filtration as mentioned above in about 15 minutes. A part of the obtained solid was dried, and the dried solid was confirmed to have a high crystallinity from the X-ray diffraction pattern (FIG. 1). Then, the washed solid was dispersed in an aqueous solution containing 1.43 g of zinc chloride (Zn/Co atomic ratio: 1.7, zinc chloride/double metal cyanide compound molar ratio: 3.4), 20 g of tert-butyl alcohol (hereinafter referred to as TBA) and 20 g of water (TBA: 50 mass % aqueous solution), and a contact treatment of the solid by heating was carried out while stirring the obtained slurry at 60° C. for 60 minutes.

The solid subjected to the contact treatment by heating was separated by filtration (about 100 minutes) in the same manner as mentioned above. Then, the solid subjected to the contact treatment by heating was dispersed in a liquid for washing containing 36 g of TBA and 4 g of water again, and washing with the TBA aqueous solution was carried out, followed by filtration (about 120 minutes) to separate a solid containing a DMC catalyst. The wet solid cake thus obtained was dried at 50° C. for 4 hours, followed by pulverization to obtain a DMC catalyst A1. The filtration time required for solid separation was shorter than that in production of a catalyst of Example 8 as a whole.

EXAMPLE 2

To an aqueous solution containing 2.1 g of potassium hexacyanocobaltate $K_3Co(CN)_6$ and 78 g of water heated to 40° C. in a 200 ml flask, 5 g of an aqueous solution containing 1.38 g of zinc chloride (Zn/Co atomic ratio: 1.61) was dropwise added over 10 minutes. During the dropwise addition, the reaction solution was stirred with a stirrer made of a polytetrafluoroethylene resin at 300 rpm, and after completion of the dropwise addition, stirring was further continued at 60° C. for 60 minutes. Then, filtration was carried out under reduced pressure by means of a circular filter plate having a diameter of 4 cm by using a 5C filter paper, and a solid was separated in about 15 minutes.

Figure 2:
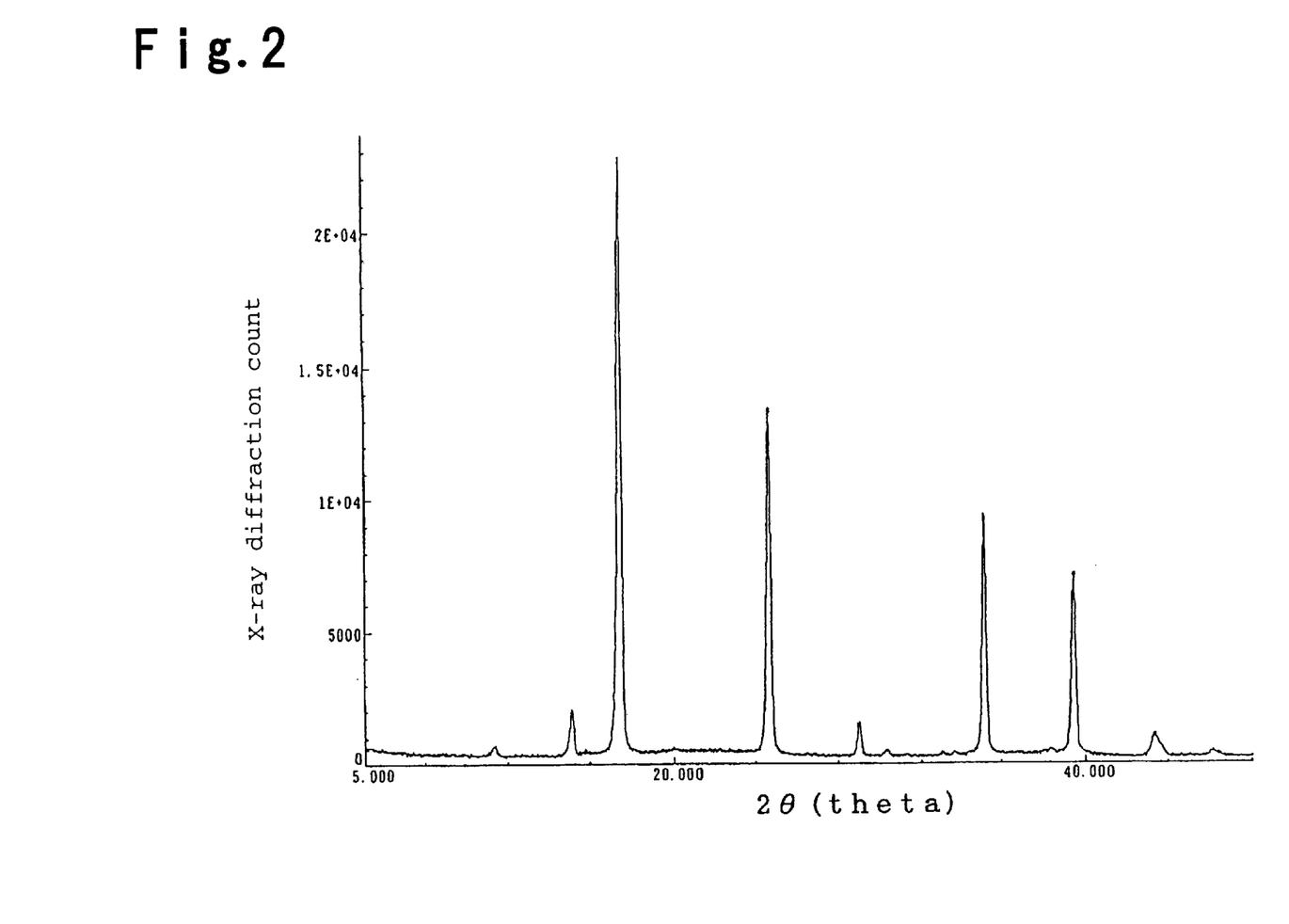
FIG. 2 is an X-ray diffraction pattern of a powder of the double metal cyanide compound obtained by drying the precipitated solid after washed with water in Example 2.

Then, the solid was washed with 40 g of water and subjected to filtration in the same manner as in Example 1. The dried solid was confirmed to have a high crystallinity from the X-ray diffraction pattern (FIG. 2). Then, the washed solid was dispersed in an aqueous solution containing 1.43 g of zinc chloride (Zn/Co atomic ratio: 1.7, zinc chloride/double metal cyanide compound molar ratio: 3.4), 20 g of TBA and 20 g of water (TBA: 50 mass % aqueous solution), and a contact treatment of the solid by heating was carried out while stirring the obtained slurry at 60° C. for 60 minutes.

The solid subjected to the contact treatment by heating was separated by filtration (about 100 minutes) in the same manner as mentioned above. Then, washing with the TBA aqueous solution, drying and pulverization were carried out in the same manner as in Example 1 to obtain a DMC catalyst A2.

EXAMPLE 3

A DMC catalyst A3 was obtained in the same manner as in Example 2 except that 40 g of a TBA aqueous solution having a TBA concentration of 35 mass % was used in the contact treatment by heating with the TBA aqueous solution containing zinc chloride.

EXAMPLE 4

A DMC catalyst A4 was obtained in the same manner as in Example 2 except that 40 g of a TBA aqueous solution having a TBA concentration of 75 mass % was used in the contact treatment by heating with the TBA aqueous solution containing zinc chloride.

EXAMPLE 5

A DMC catalyst A5 was obtained in the same manner as in Example 2 except that 40 g of a TBA aqueous solution having a TBA concentration of 85 mass % was used in the contact treatment by heating with the TBA aqueous solution containing zinc chloride.

EXAMPLE 6

To an aqueous solution containing 2.1 g of potassium hexacyanocobaltate $K_3CO(CN)_6$, 40 g of TBA and 78 g of water heated to 40° C. in a 200 ml flask, 15 g of an aqueous solution containing 5.1 g of zinc chloride (Zn/Co atomic ratio: 6) was dropwise added over 30 minutes. During the dropwise addition, the reaction solution was stirred with a stirrer made of a polytetrafluoroethylene resin at 300 rpm, and after completion of the dropwise addition, stirring was further continued at 60° C. for 60 minutes. Then, filtration was carried out under reduced pressure by means of a circular filter plate having a diameter of 4 cm by using a 5C filter paper, and a solid was separated in about 90 minutes. The solid was in the form of paste, and the filtration was difficult as compared with Example 2.

Then, the solid was dispersed in 15 g of TBA and 25 g of water again, followed by stirring at room temperature for 30 minutes, and the washed solid was separated by the filtration as mentioned above in about 120 minutes. Then, the washed solid was dispersed in 36 g of TBA and 4 g of water again, followed by stirring at room temperature for 30 minutes, and the washed solid was separated by the filtration as mentioned above in about 150 minutes. The wet solid cake thus obtained was dried at 50° C. for 4 hours, followed by pulverization to obtain a DMC catalyst B1.

EXAMPLE 7

To an aqueous solution containing 2.1 g of potassium hexacyanocobaltate $K_3CO(CN)_6$, 40 g of TBA and 78 g of water heated to 40° C. in a 200 ml flask, 15 g of an aqueous solution containing 5.1 g of zinc chloride (Zn/Co atomic ratio: 6) was dropwise added over 30 minutes. During the dropwise addition, the reaction solution was stirred with a stirrer made of a polytetrafluoroethylene resin at 300 rpm, and after completion of the dropwise addition, stirring was further continued at 60° C. for 60 minutes. Then, filtration was carried out under reduced pressure by means of a circular filter plate having a diameter of 4 cm by using a 5C filter paper, and a solid was separated in about 90 minutes. Then, the solid was dispersed in 40 g of water, and washing operation for separation by filtration was carried out twice. Then, in the same manner as in Example 6, washing with the TBA-containing aqueous solution was carried out twice, followed by drying and pulverization to obtain a DMC catalyst C1.

EXAMPLE 8

To an aqueous solution containing 2.1 g of potassium hexacyanocobaltate $K_3CO(CN)_6$ and 78 g of water heated to 40° C. in a 200 ml flask, 15 g of an aqueous solution containing 5.1 g of zinc chloride (Zn/Co atomic ratio: 6) was dropwise added over 30 minutes. During the dropwise addition, the reaction solution was stirred with a stirrer made of a polytetrafluoroethylene resin at 300 rpm, and after completion of the dropwise addition, stirring was further continued at 60° C. for 60 minutes. Then, filtration was carried out under reduced pressure by means of a circular filter plate having a diameter of 4 cm by using a 5C filter paper, and a solid was separated in about 50 minutes. This solid was confirmed to have a high crystallinity from the X-ray diffraction pattern. Then, in the same manner as in Example 6, washing with the TBA-containing aqueous solution was carried out twice, followed by drying and pulverization to obtain a DMC catalyst C2.

EXAMPLE 9

To an aqueous solution containing 2.1 g of potassium hexacyanocobaltate $K_3CO(CN)_6$, 40 g of TBA and 78 g of water heated to 40° C. in a 200 ml flask, 3 g of an aqueous solution containing 1.38 g of zinc chloride (Zn/Co atomic ratio: 1.61) was dropwise added over 10 minutes. During the dropwise addition, the reaction solution was stirred with a stirrer made of a polytetrafluoroethylene resin at 300 rpm, and after completion of the dropwise addition, stirring was further continued at 60° C. for 60 minutes. Then, filtration was carried out under reduced pressure by means of a circular filter plate having a diameter of 4 cm by using a 5C filter paper, and a solid was separated in about 30 minutes. The dried solid was confirmed to have a high crystallinity from the X-ray diffraction pattern. Then, in the same manner as in Example 6, the solid after filtration was washed with the TBA-containing aqueous solution twice, followed by drying and pulverization to obtain a DMC catalyst C3.

EXAMPLE 10

To an aqueous solution containing 2.1 g of potassium hexacyanocobaltate $K_3Co(CN)_6$ and 78 g of water heated to 40° C. in a 200 ml flask, 3 g of an aqueous solution containing 1.38 g of zinc chloride (Zn/Co atomic ratio: 1.61) was dropwise added over 10 minutes. During the dropwise addition, the reaction solution was stirred with a stirrer made of a polytetrafluoroethylene resin at 300 rpm, and after completion of the dropwise addition, stirring was further continued at 60° C. for 60 minutes. Then, filtration was carried out under reduced pressure by means of a circular filter plate having a diameter of 4 cm by using a 5C filter paper, and a solid was separated in about 15 minutes. The dried solid was confirmed to have a high crystallinity from the X-ray diffraction pattern. Then, in the same manner as in Example 6, the solid after filtration was washed with the TBA-containing aqueous solution twice, followed by drying and pulverization to obtain a DMC catalyst C4.

EXAMPLE 11

A DMC catalyst C5 was obtained in the same manner as in Example 2 except that no TBA was used at all in the contact treatment by heating with the TBA aqueous solution containing zinc chloride.

EXAMPLE 12

A DMC catalyst D1 was obtained in the same manner as in Example 2 except that the contact treatment by heating with the TBA aqueous solution containing zinc chloride was carried out at 23° C. without heating.

EXAMPLE 13

To an aqueous solution containing 67.2 g of potassium hexacyanocobaltate $K_3CO(CN)_6$ and 300 g of water heated to 40° C. in a 500 ml flask, 80 g of an aqueous solution containing 43.3 g of zinc chloride (Zn/Co atomic ratio: 1.6) was dropwise added over 30 minutes. During the dropwise addition, the reaction solution was stirred with a stirrer made of a polytetrafluoroethylene resin at 300 rpm, and after completion of the dropwise addition, stirring was further continued at 60° C. for 60 minutes. Then, filtration was carried out under a pressure of 0.25 MPa by means of a circular filter plate having a diameter of 12.5 cm by using a 5C filter paper, and a solid was separated in about 7 minutes. The obtained cake weighed 146 g, and a part of the cake was dried and the water content was measured, whereupon it was 41.7 mass %. The dried solid was confirmed to have a high crystallinity from the X-ray diffraction pattern.

Then, 24 g of the cake was dispersed in an aqueous solution containing 6.76 g of zinc chloride, 125 g of TBA and 125 g of water (TBA: 50 mass % solution) (zinc chloride concentration: 2.64 mass %, Zn/Co atomic ratio: 1.5, zinc chloride/double metal cyanide compound molar ratio: 3.0).

0.60 g of a polyol having a molecular weight of 1,500 obtained by polymerization of propylene oxide with dipropylene glycol as an initiator was added thereto. The slurry concentration was about 5.0 mass %. A contact treatment of the solid by heating was carried out while stirring the slurry at 60° C. for 90 minutes.

In the same manner as mentioned above, the solid subjected to the contact treatment by heating was separated by filtration under pressure (about 20 minutes). Then, the solid subjected to the contact treatment by heating was dispersed in a liquid for washing containing 108 g of TBA, 12 g of water and 0.2 g of the same polyol as mentioned above again, the washing with the TBA aqueous solution was carried out at room temperature for 30 minutes, and then filtration under pressure (about 30 minutes) was carried out to separate a solid containing a DMC catalyst. This cake was dispersed in a solution comprising 118 g of TBA and 2 g of water again. Part of the slurry was dried under reduced pressure and the concentration (solid content) was measured, whereupon it was 5.89 mass %. 160 g of the same polyol as mentioned above was added to the slurry, followed by mixing. This mixed liquid was subjected to a treatment under reduced pressure so that a volatile component was distilled off. The distillation was carried out at 50° C. for 2 hours and then at 60° C. for 5 hours. A DMC slurry catalyst S1 was obtained by the above method. The content of the DMC catalyst in the slurry was 4.05 mass %.

EXAMPLE 14

24 g of the zinc hexacyanocobaltate cake obtained in the same manner as in Example 13 was dispersed in an aqueous solution containing 3.38 g of zinc chloride, 40 g of TBA and 40 g of water (TBA: 50 mass % solution) (zinc chloride concentration: 4.1 mass %, Zn/Co atomic ratio: 0.75, zinc chloride/double metal cyanide compound molar ratio: 1.5). The slurry concentration was about 13 mass %. A contact treatment of the solid by heating was carried out while stirring the slurry at 60° C. for 90 minutes at 300 rpm.

The solid subjected to the contact treatment by heating was separated by filtration under pressure (about 65 minutes). Then, the solid subjected to the contact treatment by heating was dispersed in a liquid for washing containing 108 g of TBA and 12 g of water again, and washing with the TBA aqueous solution was carried out at room temperature for 30 minutes, and then filtration under pressure (about 95 minutes) was carried out to separate a solid containing a DMC catalyst. This cake was dispersed in a solution containing 118 g of TBA and 2 g of water again. Part of the slurry was dried under reduced pressure and the concentration (solid content) was measured, whereupon it was 5.53 mass %. 160 g of the same polyol as mentioned above was added to the slurry, followed by mixing. This mixed liquid was subjected to a treatment under reduced pressure so that a volatile component was distilled off. The distillation was carried out at 50° C. for 2 hours and then at 60° C. for 5 hours. A DMC slurry catalyst S2 was obtained by the above method. The content of the DMC catalyst in the slurry was 4.34 mass %.

EXAMPLE 15

24 g of the zinc hexacyanocobaltate cake obtained in the same manner as in Example 13 was dispersed in an aqueous solution containing 13.52 g of zinc chloride, 125 g of TBA and 125 g of water (TBA: 50 mass % solution) (zinc chloride concentration: 5.1 mass %, Zn/Co atomic ratio: 3.0, zinc chloride/double metal cyanide compound molar ratio: 6.0).

0.80 g of the same polyol as used in Example 13, having a molecular weight of 1,500, was added thereto. The slurry concentration was about 4.9 mass %. A contact treatment of the solid by heating was carried out while stirring the slurry at 60° C. for 90 minutes at 300 rpm. Then, 125 g of a 50 mass % aqueous solution of TBA was added at room temperature, followed by stirring for 30 minutes.

The solid subjected to the contact treatment by heating was separated by filtration under pressure (about 20 minutes). Then, the solid subjected to the contact treatment by heating was dispersed in a liquid for washing containing 108 g of TBA and 12 g of water again, and washing with the TBA aqueous solution was carried out at room temperature for 30 minutes, and then filtration under pressure (about 35 minutes) was carried out to separate a solid containing a DMC catalyst. This cake was dispersed in a solution containing 118 g of TBA and 2 g of water again. Part of the slurry was dried under reduced pressure and the concentration (solid content) was measured, whereupon it was 5.63 mass %. 160 g of the same polyol as mentioned above was added to the slurry, followed by mixing. This mixed liquid was subjected to a treatment under reduced pressure so that a volatile component was distilled off. The distillation was carried out at 50° C. for 2 hours and then at 60° C. for 5 hours. A DMC slurry catalyst S3 was obtained by the above method. The content of the DMC catalyst in the slurry was 4.54 mass %.

EXAMPLE 16

24 g of the zinc hexacyanocobaltate cake obtained in the same manner as in Example 13 was dispersed in an aqueous solution containing 6.76 g of zinc chloride, 125 g of TBA and 125 g of water (TBA: 50 mass % solution) (zinc chloride concentration: 2.64 mass %, Zn/Co atomic ratio: 1.5, zinc chloride/double metal cyanide compound molar ratio: 3.0). 0.60 g of the same polyol as used in Example 13, having a molecular weight of 1,500, was added thereto. The slurry concentration was about 5.0 mass %.

A contact treatment of the solid by heating was carried out while stirring the slurry at 60° C. for 90 minutes at 300 rpm. Then, 120 g of a 50 mass % aqueous solution of TBA was added at room temperature, followed by stirring for 30 minutes.

The solid subjected to the contact treatment by heating was separated by filtration under pressure (about 20 minutes). Then, the solid subjected to the contact treatment by heating was dispersed in a liquid for washing containing 108 g of TBA, 12 g of water and 0.2 g of the same polyol as mentioned above again, and washing with the TBA aqueous solution was carried out at room temperature for 30 minutes, and then filtration under pressure (about 28 minutes) was carried out to separate a solid containing a DMC catalyst. Part of the cake was dried under reduced pressure and the concentration (solid content) was measured, whereupon it was 25 mass %. 160 g of the same polyol as mentioned above was added to the cake, followed by mixing at room temperature for 10 hours. A DMC slurry catalyst S4 was obtained by the above method. The content of the DMC catalyst in the slurry was 4.26 mass %.

EXAMPLE 17

A DMC slurry catalyst S5 was obtained in the same manner as in Example 13 except that 24 g of the zinc hexacyanocobaltate cake obtained in the same manner as in Example 13 was dried under reduced pressure at 60° C. and formed into a powder, and then used. The content of the DMC catalyst in the slurry was 4.58 mass %.

EXAMPLE 18

A DMC slurry catalyst S6 was obtained in the same manner as in Example 14 except that the contact treatment by heating was carried out in an aqueous solution containing 2.25 g of zinc chloride, 40 g of TBA and 40 g of water (TBA: 50 mass % solution) (zinc chloride concentration: 2.7 mass %, Zn/Co atomic ratio: 0.50, zinc chloride/double metal cyanide compound molar ratio: 1.0). The content of the DMC catalyst in the slurry was 4.68 mass %.

EXAMPLE 19

A DMC slurry catalyst S7 was obtained in the same manner as in Example 13 except that the contact treatment by heating was carried out in an aqueous solution containing 6.76 g of zinc chloride, 75 g of TBA and 175 g of water (TBA: 30 mass % solution) (zinc chloride concentration: 2.64 mass %, Zn/Co atomic ratio: 1.5, zinc chloride/double metal cyanide compound molar ratio: 3.0). The content of the DMC catalyst in the slurry was 4.77 mass %.

EXAMPLE 20

A DMC slurry catalyst S8 was obtained in the same manner as in Example 13 except that the contact treatment by heating was carried out in an aqueous solution containing 6.76 g of zinc chloride, 200 g of TBA and 50 g of water (TBA: 80 mass % solution) (zinc chloride concentration: 2.64 mass %, Zn/Co atomic ratio: 1.5, zinc chloride/double metal cyanide compound molar ratio: 3.0). The content of the DMC catalyst in the slurry was 4.48 mass %.

EXAMPLE 21

A DMC slurry catalyst S9 was obtained in the same manner as in Example 14 except that the contact treatment by heating was carried out in an aqueous solution containing 3.38 g of zinc chloride, 104 g of TBA and 104 g of water (TBA: 50 mass % solution) (zinc chloride concentration: 1.6 mass %, Zn/Co atomic ratio: 0.75, zinc chloride/double metal cyanide compound molar ratio: 1.5). The content of the DMC catalyst in the slurry was 4.39 mass %.

Production 1 of Polyether Polyol 30 g of polyoxypropylene triol having a molecular weight of 1,000, obtained by reacting propylene oxide (hereinafter referred to as PO) with glycerol, and the DMC catalyst (about 5 mg) as a catalyst were introduced in a 500 ml pressure-resistant reactor made of stainless steel equipped with a stirrer. In a case of the DMC slurry catalyst, it was introduced so that the DMC catalyst was about 1 mg. After replacement with nitrogen, the temperature was raised to 120° C., and 8 g of PO was subjected to a spot reaction, and after the pressure in the system decreased, PO was continuously introduced thereinto at a rate of 2.0 g/min from 8 to 60 g, at from 1.0 to 1.5 g/min from 60 to 150 g, and at 1.0 g/min up to 230 g of PO with regard to the catalyst having a long catalytic life, at a stirring rate of 700 rpm, and reacted. The catalyst used, the catalytic activity obtained by dividing the polymer yield by the catalyst weight (unit: kg·PO/g catalyst, the reacting weight of PO per g of catalyst), the molecular weight of the obtained polyether polyol as calculated as polystyrene measured by gel permeation chromatography (GPC), the hydroxyl value (unit: mgKOH/g) and the degree of total unsaturation (unit: meq/g) are shown in Table 1. The catalyst activity 0 represents that no decrease of pressure in the system was confirmed even after a lapse of 120 minutes after the reaction. Further, in the case of the catalyst S1, the viscosity of the polyether polyol became high and the stirring could not be carried out adequately, and thus the reaction was terminated and the polyether polyol was taken out even thought the catalyst still had an activity.

TABLE 1

| Catalyst | Amount of PO | Catalytic activity | Molecular weight | Hydroxyl value | Degree of total unsaturation |
|---|---|---|---|---|---|
| A1 | 230 | 41 | 11,200 | 19.5 | 0.0051 |
| A2 | 230 | 42 | 11,300 | 19.8 | 0.0055 |
| A3 | 230 | 45 | 11,400 | 19.0 | 0.0048 |
| A4 | 230 | 41 | 11,500 | 20.1 | 0.0053 |
| A5 | 80 | 15 | 4,400 | 48.1 | 0.0062 |
| B1 | 230 | 42 | 11,400 | 19.8 | 0.0056 |
| C1 | 0 | 0 | — | — | — |
| C2 | 0 | 0 | — | — | — |
| C3 | 0 | 0 | — | — | — |
| C4 | 0 | 0 | — | — | — |
| C5 | 0 | 0 | — | — | — |
| D1 | 33 | 5 | 2,500 | 90.0 | 0.0150 |
| S1 | 180 | 180 | 15,500 | 11.0 | 0.0075 |

Example 6 is one example of a synthesis method of a conventional DMC catalyst, and the time required for filtration was long, and the metal chloride concentration in the waste water was high, as compared with Examples of the present invention. Example 7 is a conventional method wherein washing with water was carried out to remove the alkali metal salt as in the present invention, no active catalyst was obtained. In Example 8 wherein a crystalline solid was used, and no zinc chloride was used at the latter step, no active catalyst was obtained. In Example 9 wherein zinc chloride in excess of 7% over the stoichiometric amount of the Zn/Co atomic ratio 1.61 was used as in the present invention to obtain a crystalline double metal cyanide compound, and no zinc chloride was used in the latter step, no adequate catalyst was obtained. In Example 10 wherein the crystalline double metal cyanide compound was obtained at a Zn/Co atomic ratio of 1.61 as in the present invention, without organic ligand, and no zinc chloride was used in the latter step, no active catalyst was obtained. In Example 11 wherein no organic ligand was used in the latter step, no active catalyst was obtained. In Example 12 wherein heating was not carried out in the contact treatment by heating, only a catalyst having a low activity was obtained.

On the other hand, with the DMC catalysts A1, A2, A3, A4 and A5, which were advantageous in view of catalyst production since the time of the solid separation was short, and the waste disposal at the time of solid preparation was easy, the time from the PO initial feed to the initiation of the polymerization was from 20 to 30 minutes, which was the same as that of the DMC catalyst B1 produced by a conventional method. Further, the catalysts A1, A2, A3 and A4 had a high catalytic activity similar to the catalyst B1.

Production 2 of Polyether Polyol 30 g of a polyoxypropylene triol having a molecular weight of 1,000, obtained by reacting PO with glycerol, and the DMC slurry catalyst (about 3 mg as the DMC catalyst) as a catalyst were introduced in a 500 ml pressure-resistant reactor made of stainless steel equipped with a stirrer. After replacement with nitrogen, the temperature was raised to 110° C., and 8 g of PO was subjected to the spot reaction, and after the pressure in the system decreased, the temperature was raised to 120° C. First, 62 g of PO was supplied at a rate of 2 g/90 seconds with a stirring rate of 500 rpm, and then the stirring rate was increased to 700 rpm, and 100 g of PO was supplied at a rate of 2 g/90 seconds. The catalyst used, the molecular weight distribution (Mw/Mn) measured by gel permeation chromatography (GPC), the hydroxyl value (unit: mgKOH/ g) of the obtained polyol, the degree of unsaturation (unit: meq/g) and the viscosity at 25° C. are shown in Table 2.

TABLE 2

| Catalyst | GPC MW/Mn | Hydroxyl value mgKOH/g | Degree of unsaturation meq/g | Viscosity mPa·s |
|---|---|---|---|---|
| S1 | 1.51 | 25.5 | 0.0045 | 2,740 |
| S2 | 1.57 | 25.8 | 0.0051 | 2,850 |
| S3 | 1.49 | 25.1 | 0.0052 | 2,670 |
| S4 | 1.52 | 25.6 | 0.0048 | 2,800 |
| S5 | 1.69 | 25.5 | 0.0071 | 3,380 |
| S6 | 1.66 | 25.9 | 0.0065 | 3,080 |
| S7 | 1.52 | 25.2 | 0.0054 | 2,790 |
| S8 | 1.53 | 25.6 | 0.0060 | 2,820 |
| S9 | 1.64 | 25.8 | 0.0070 | 2,900 |

The DMC slurry catalyst obtained by the present invention has a high activity, and is easily produced. Further, the viscosity of the polyol obtained with each of the slurry catalysts is low.

According to the production process of the DMC catalyst of the present invention, a DMC catalyst having a high activity can easily be produced. Particularly, a DMC catalyst for ring opening polymerization of alkylene oxide having an extremely high activity, capable of producing a polyether polyol having a low degree of unsaturation, can be produced, by carrying out the contact treatment by heating at a specific temperature, with a specific organic ligand concentration, with a specific metal salt concentration, with a specific crystalline double metal cyanide compound concentration, at a specific ratio of the crystalline double metal cyanide compound to the metal salt.

Production of the catalyst for ring opening polymerization of alkylene oxide of the present invention is easy, the catalyst const is low, and the catalyst has a high activity and a long life. Further, by using it, a polyether polyol having a low degree of unsaturation can be produced by reacting an alkylene oxide with a polyhydroxy compound having at least 2 hydroxyl groups as an initiator.

The entire disclosure of Japanese Patent Application No. 2001-264866 filed on Aug. 31, 2001 including specification, claims, drawings and summary are incorporated herein by reference in its entirety.

What is claimed is:

1. A process comprising
    contacting a substantially crystalline double metal cyanide compound at from 45 to 125° C. with a solution consisting essentially of water, an organic ligand and a metal salt, and then separating the resulting solid from the slurry to form a double metal cyanide complex catalyst.

2. The process according to claim 1, wherein the aqueous solution containing an organic ligand and a metal salt contains the organic ligand in an amount of from 15 to 85 mass % based on the total amount of the organic ligand and water.

3. The process according to claim 1, wherein the double metal cyanide compound is a zinc hexacyanometalate.

4. The process according to claim 1, wherein the metal salt is a zinc halide.

5. The process according to claim 1, wherein the organic ligand is at least one compound selected from the group consisting of tert-butyl alcohol, n-butyl alcohol, iso-butyl alcohol, tert-pentyl alcohol, iso-pentyl alcohol, N,N-dimethylacetamide, ethylene glycol dimethyl ether, ethylene glycol mono-tert-butyl ether, diethylene glyocol dimethyl ether, triethylene glycol dimethyl ether, iso-propyl alcohol and dioxane.

6. The process according to claim 1, wherein the substantially crystalline double metal cyanide compound is obtained by mixing an aqueous solution of a metal salt with an aqueous solution of a transition metal cyanide compound in a molar amount of the metal salt in excess of from 3 to 30% over the stoichiometric amount, followed by separation from the obtained mixed solution.

7. The process according to claim 6, wherein the aqueous solution containing an organic ligand and a metal salt contains the organic ligand in an amount of from 15 to 85 mass % based on the total amount of the organic ligand and water.

8. The process according to claim 6, wherein the double metal cyanide compound is a zinc hexacyanometalate.

9. The process according to claim 6, wherein the metal salt is a zinc halide.

10. The process according to claim 6, wherein the organic ligand is at least one compound selected from the group consisting of tert-butyl alcohol, n-butyl alcohol, iso-butyl alcohol, tert-pentyl alcohol, iso-pentyl alcohol, N,N-dimethylacetamide, ethylene glycol dimethyl ether, ethylene glycol mono-tert-butyl ether, diethylene glyocol dimethyl ether, triethylene glycol dimethyl ether, iso-propyl alcohol and dioxane.

11. The process according to claim 6, wherein the substantially crystalline double metal cyanide compound is obtained by mixing an aqueous solution of a zinc halide with an aqueous solution of an alkali metal hexacyanocobaltate at a Zn/Co atomic ratio of from 1.545 to 1.800, followed by separation from the obtained mixed solution.

12. The process according to claim 11, wherein the aqueous solution containing an organic ligand and a metal salt contains the organic ligand in an amount of from 15 to 85 mass % based on the total amount of the organic ligand and water.

13. The process according to claim 11, wherein the metal salt is a zinc chloride.

14. The process according to claim 11, wherein the organic ligand is at least one compound selected from the group consisting of tert-butyl alcohol, n-butyl alcohol, iso-butyl alcohol, tert-pentyl alcohol, iso-pentyl alcohol, N,N-dimethylacetamide, ethylene glycol dimethyl ether, ethylene glycol mono-tert-butyl ether, diethylene glyocol dimethyl ether, triethylene glycol dimethyl ether, iso-propyl alcohol and dioxane.

15. The process according to claim 1, wherein a poly (alkylene oxide) is added before the contact treatment by heating so that the contact treatment by heating is carried out in the coexistence of the poly(alkylene oxide).

16. A double metal cyanide complex catalyst which is obtained by the process of claim 1.

17. A double metal cyanide complex slurry catalyst comprising the double metal cyanide complex catalyst for ring opening polymerization of alkylene oxide of claim 17 dispersed in a poly(alkylene oxide).

18. The process according to claim 1, wherein the substantially crystalline double metal cyanide compound is prepared in the absence of an organic ligand.

19. The process according to claim 1, wherein the substantially crystalline double metal cyanide compound is obtained by dropwise adding an aqueous solution of a metal salt to an aqueous solution of a transition metal cyanide compound.

20. The process according to claim 1, wherein the substantially crystalline double metal cyanide compound has four peaks at 17.1–17.5 degrees, 23.4–24.7 degrees, 34.8–35.2 degrees and 39.1–39.5 degrees with a 2θ value of at most 40 degrees.

21. The process according to claim 1, wherein the substantially crystalline double metal cyanide compound is contacted with the solution at a temperature of from 60 to 125° C.

22. The process according to claim 1, wherein the organic ligand is t-butyl alcohol.

* * * * *